(No Model.) 13 Sheets—Sheet 2.
W. A. JOHNSTON, A. W. BROWNE & J. C. DAVIDSON.
ELECTRIC MOTOR APPARATUS.
No. 511,621. Patented Dec. 26, 1893.
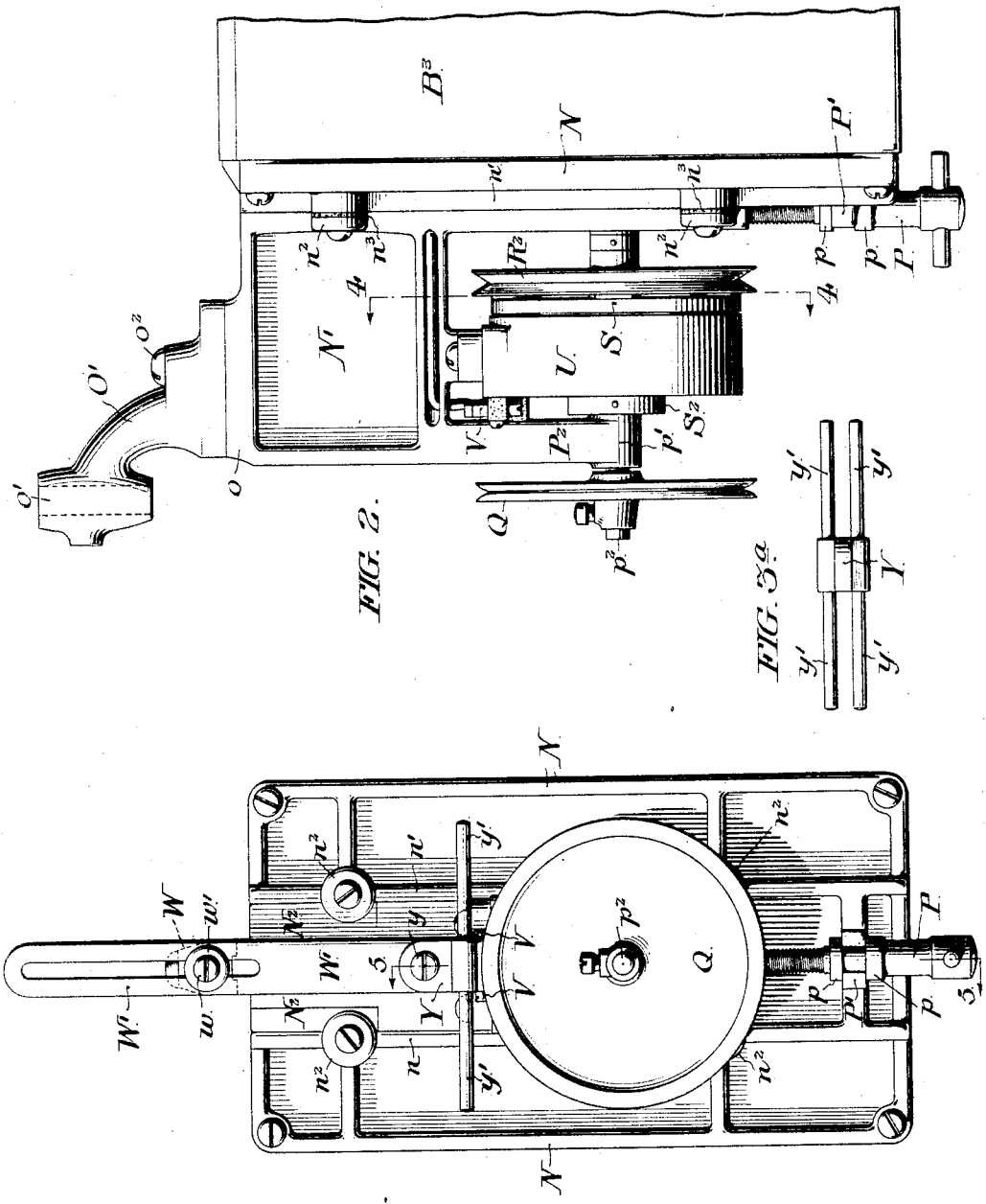
WITNESSES:
Edw. F. Simpson, Jr.
Jacob N. Belt.
INVENTORS:
W. A. Johnston,
A. W. Browne and
J. C. Davidson
by their attorney

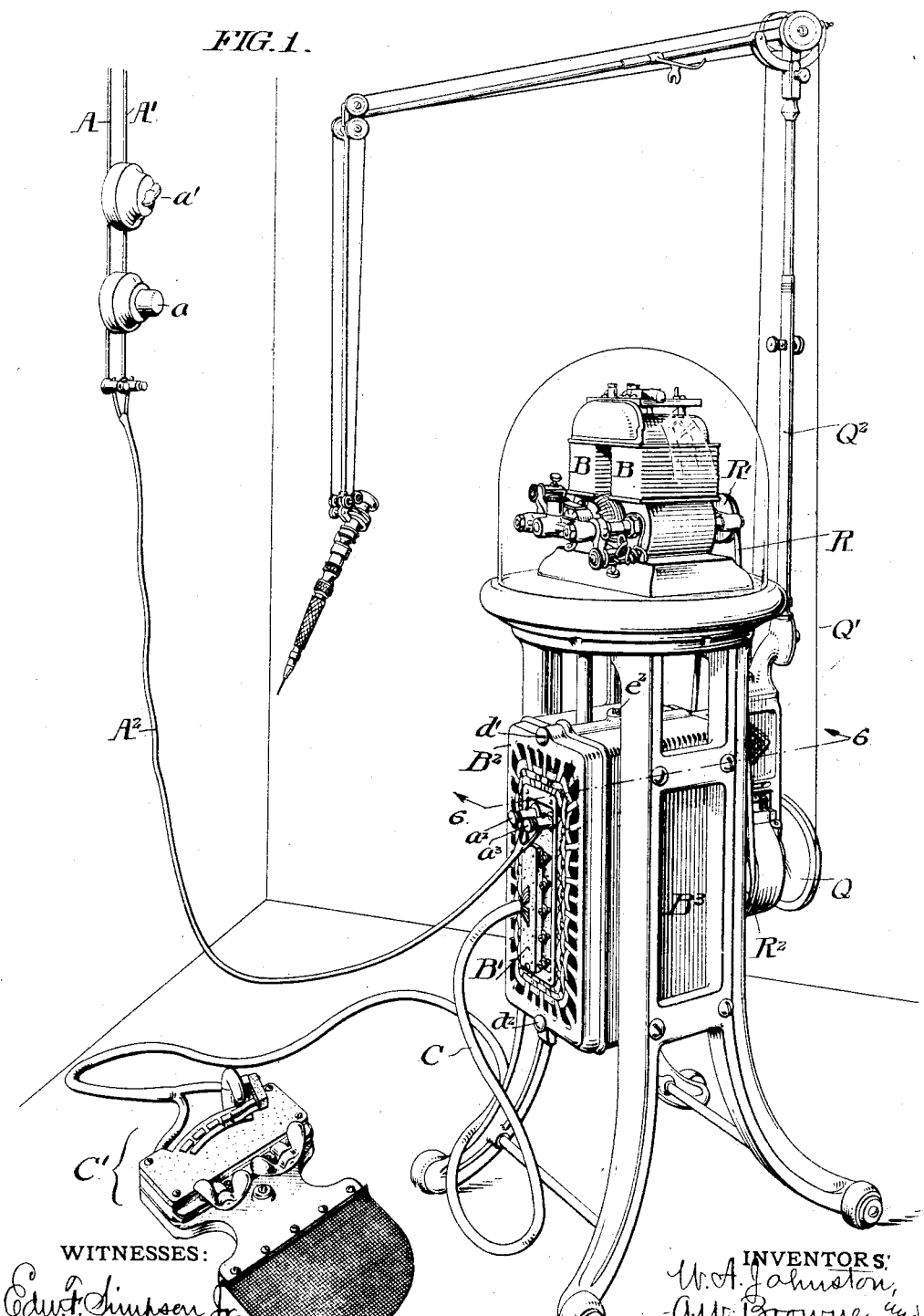

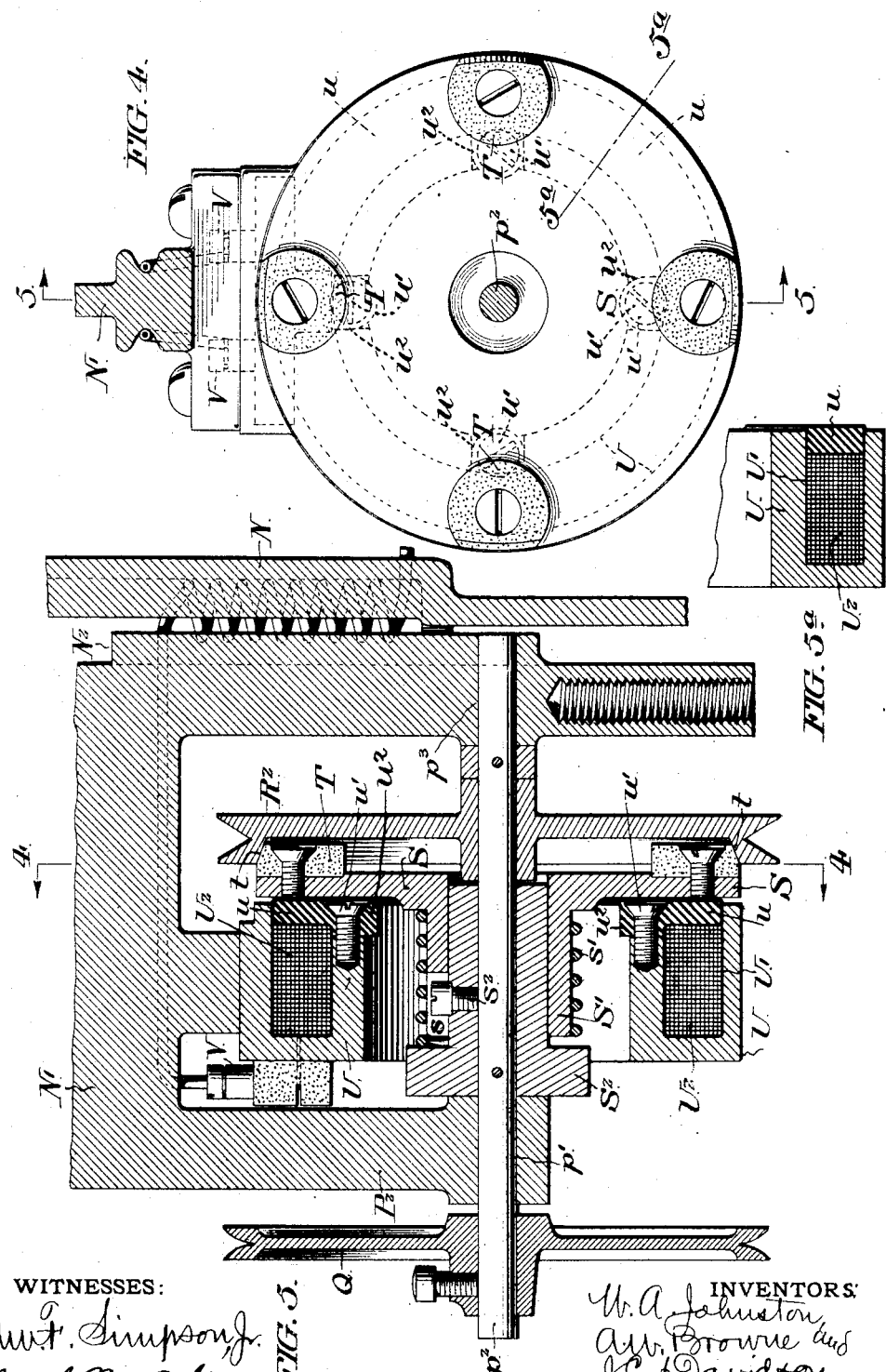

(No Model.) 13 Sheets—Sheet 4.
W. A. JOHNSTON, A. W. BROWNE & J. C. DAVIDSON.
ELECTRIC MOTOR APPARATUS.
No. 511,621. Patented Dec. 26, 1893.

WITNESSES:
Edw. F. Simpson, Jr.
Jacob N. Belt.

INVENTORS:
W. A. Johnston,
A. W. Browne and
J. C. Davidson,
by their attorney J. C. Peyton.

(No Model.) 13 Sheets—Sheet 5.
W. A. JOHNSTON, A. W. BROWNE & J. C. DAVIDSON.
ELECTRIC MOTOR APPARATUS.
No. 511,621. Patented Dec. 26, 1893.
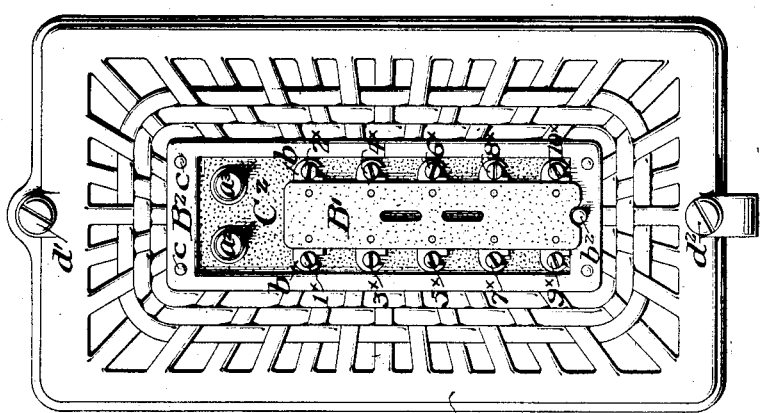
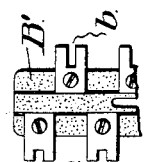
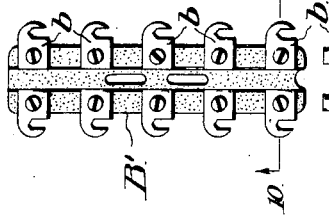
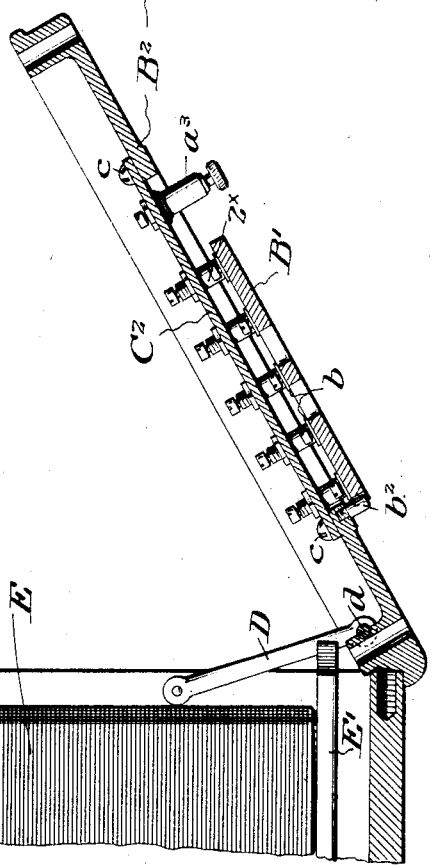
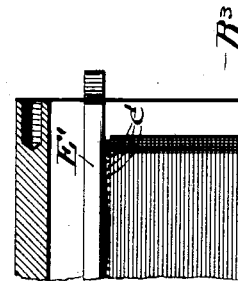
WITNESSES:
Edw. F. Simpson, Jr.
Jacob N. Belt
INVENTORS:
W. A. Johnston,
A. W. Browne and
John C. Davidson,
by their attorney J. Peyton.

(No Model.) 13 Sheets—Sheet 6.
W. A. JOHNSTON, A. W. BROWNE & J. C. DAVIDSON.
ELECTRIC MOTOR APPARATUS.
No. 511,621. Patented Dec. 26, 1893.
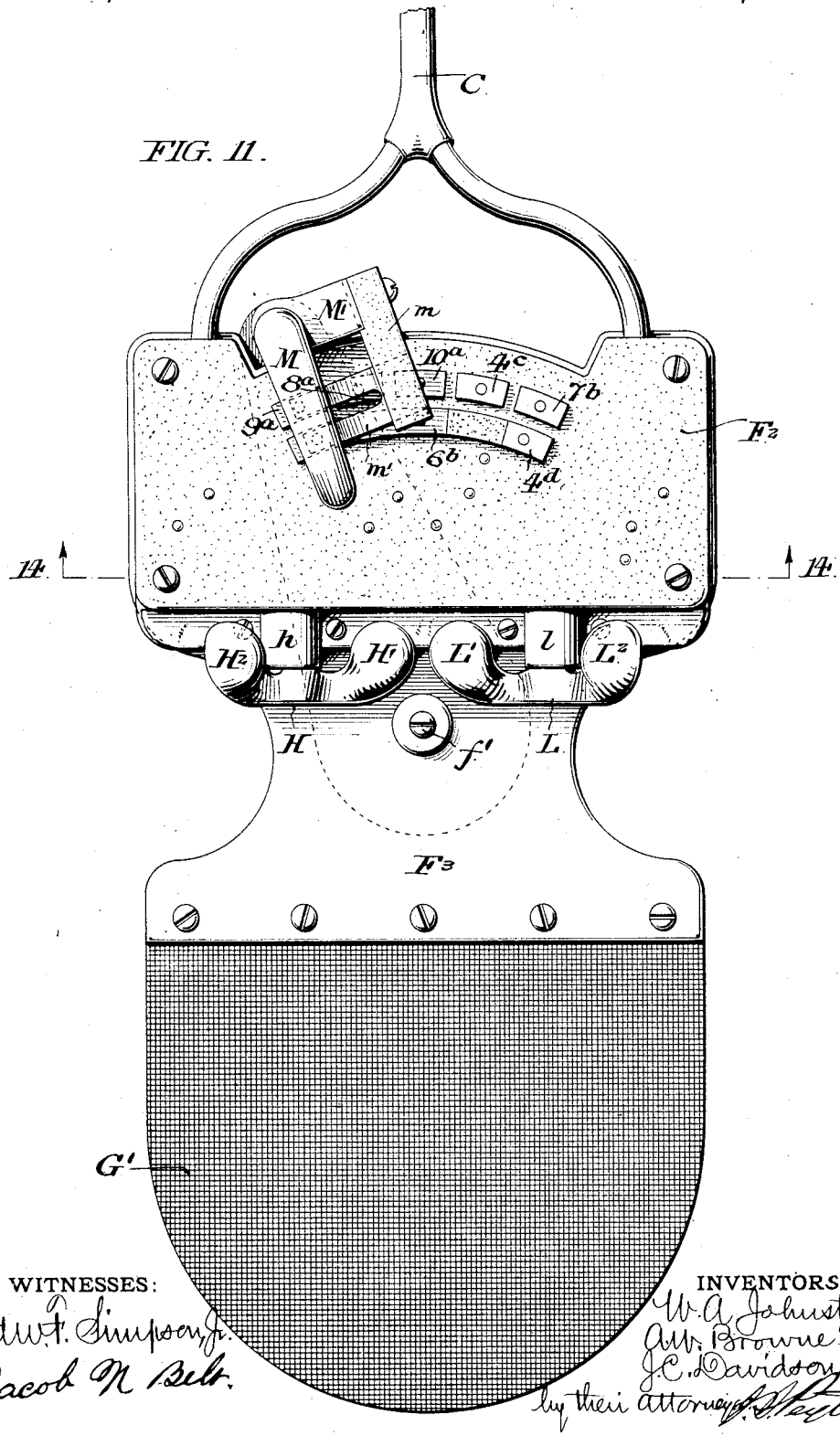

(No Model.) 13 Sheets—Sheet 7.

W. A. JOHNSTON, A. W. BROWNE & J. C. DAVIDSON.
ELECTRIC MOTOR APPARATUS.

No. 511,621. Patented Dec. 26, 1893.

WITNESSES:
Edw. F. Simpson, Jr.
Jacob N. Belt

INVENTORS:
W. A. Johnston,
A. W. Browne, and
J. C. Davidson
by their attorney (No Model.) 13 Sheets—Sheet 8.

W. A. JOHNSTON, A. W. BROWNE & J. C. DAVIDSON.
ELECTRIC MOTOR APPARATUS.

No. 511,621. Patented Dec. 26, 1893.

WITNESSES:
Edw. F. Simpson, Jr.
Jacob N. Belt

INVENTORS:
W. A. Johnston,
A. W. Browne and
J. C. Davidson
by their attorney J. Peyton

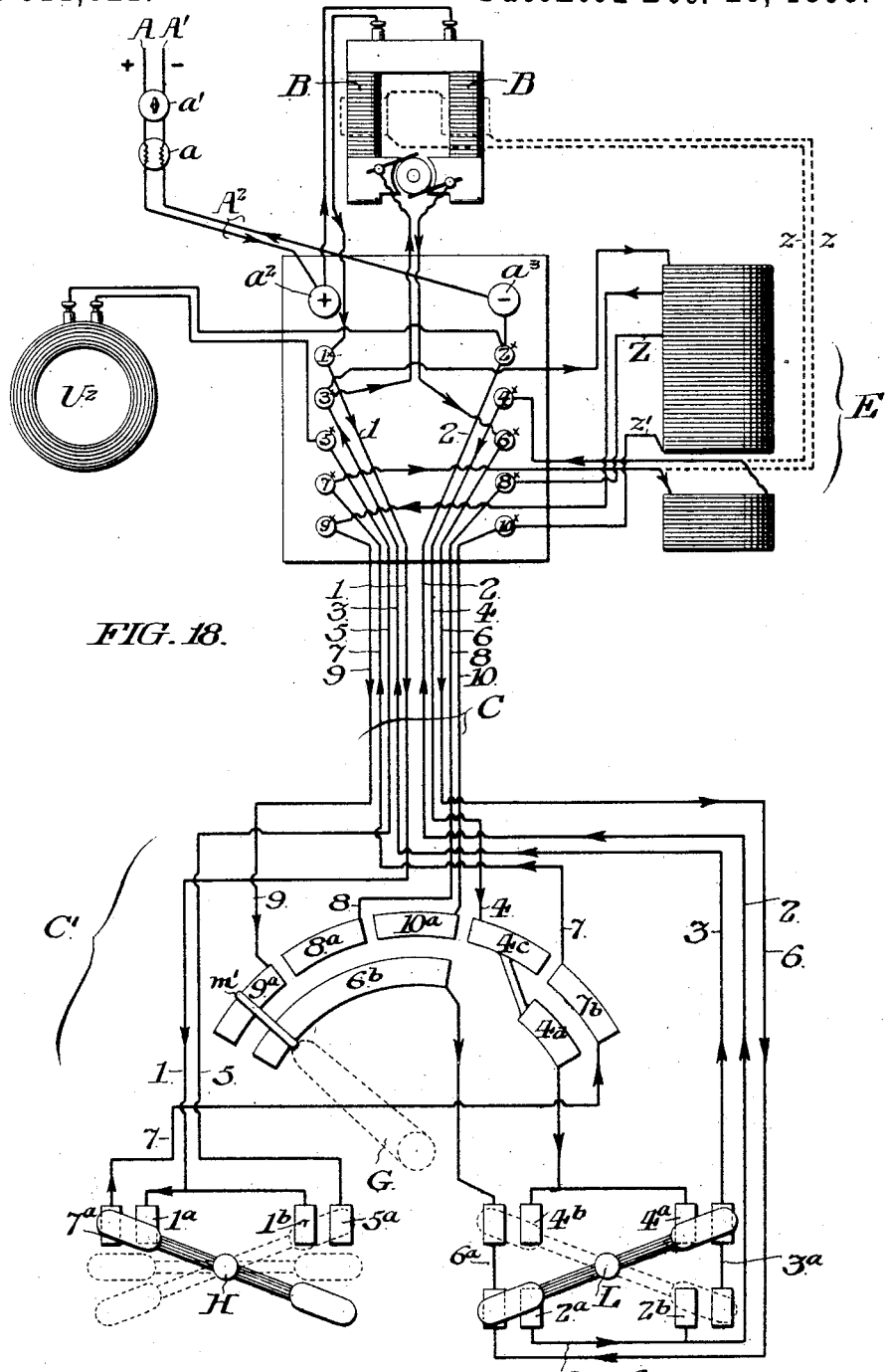

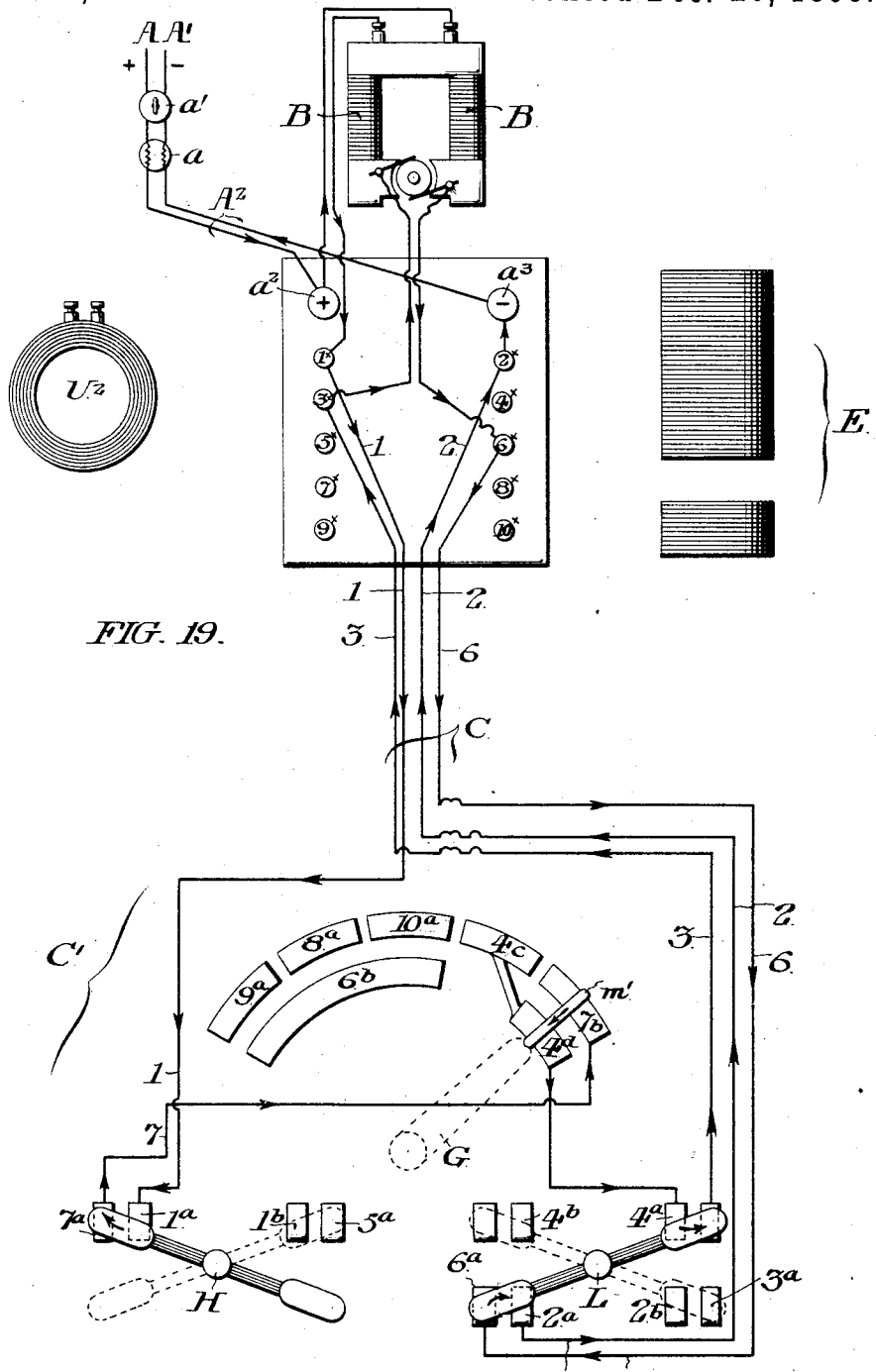

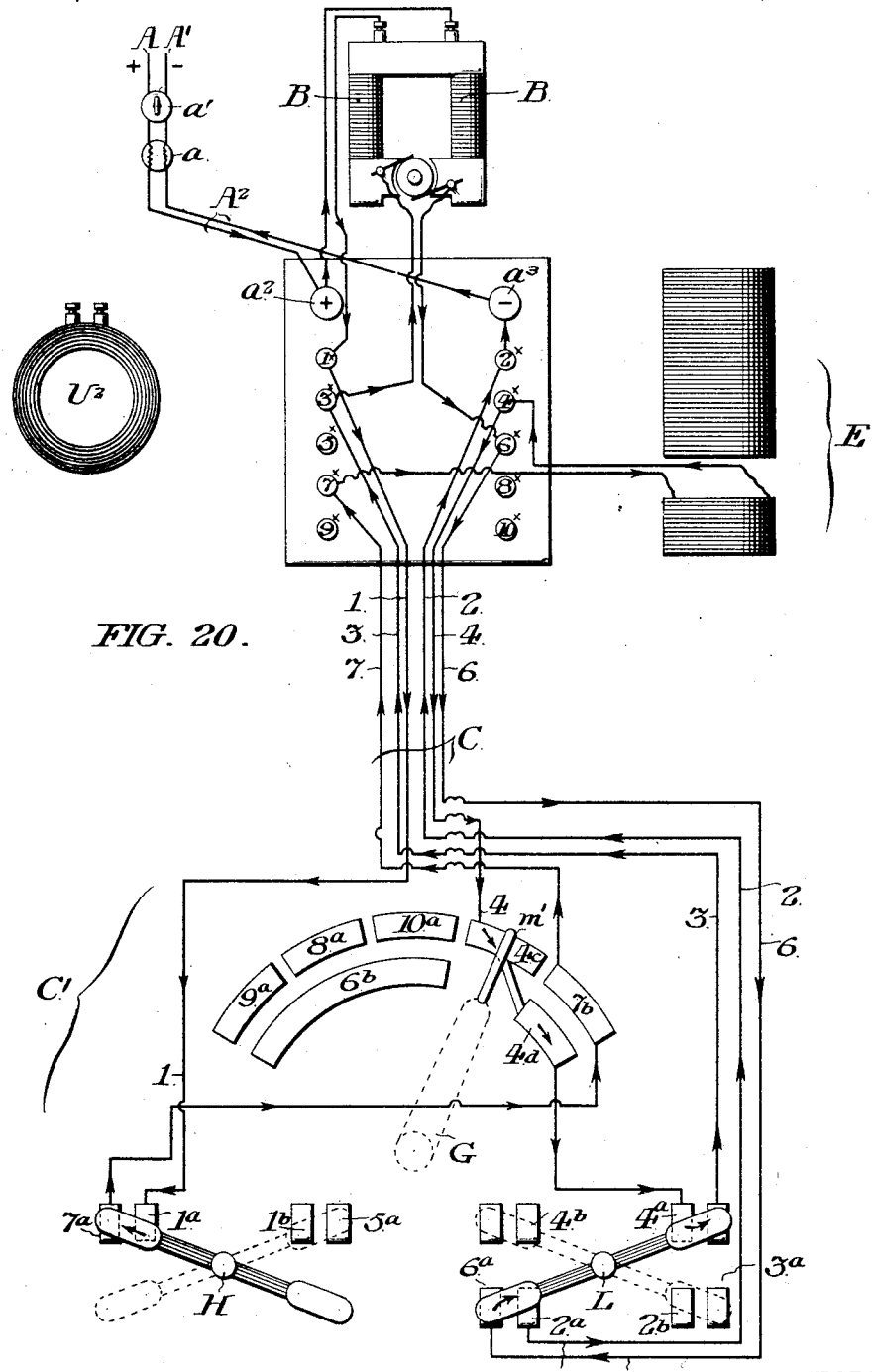

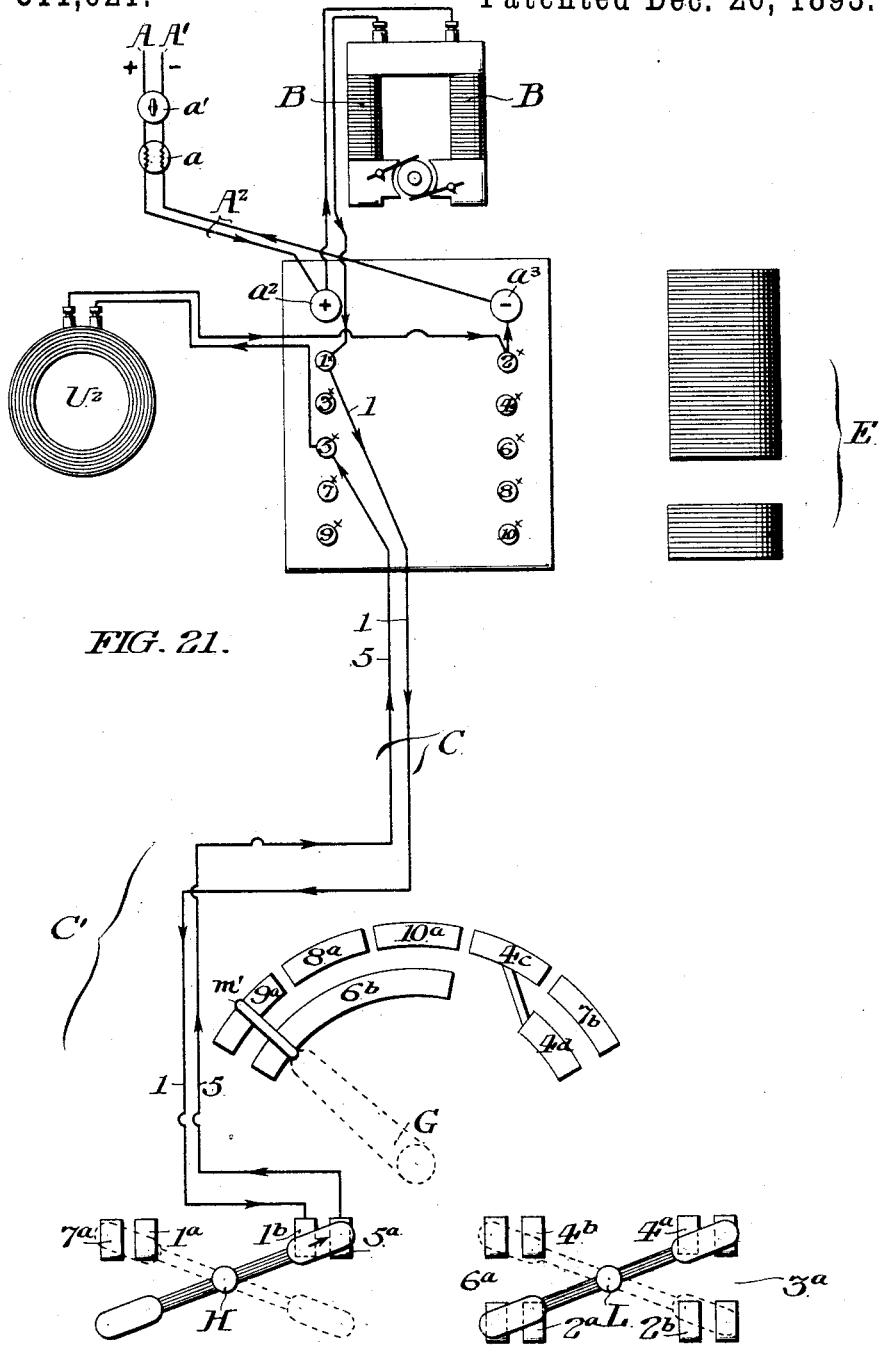

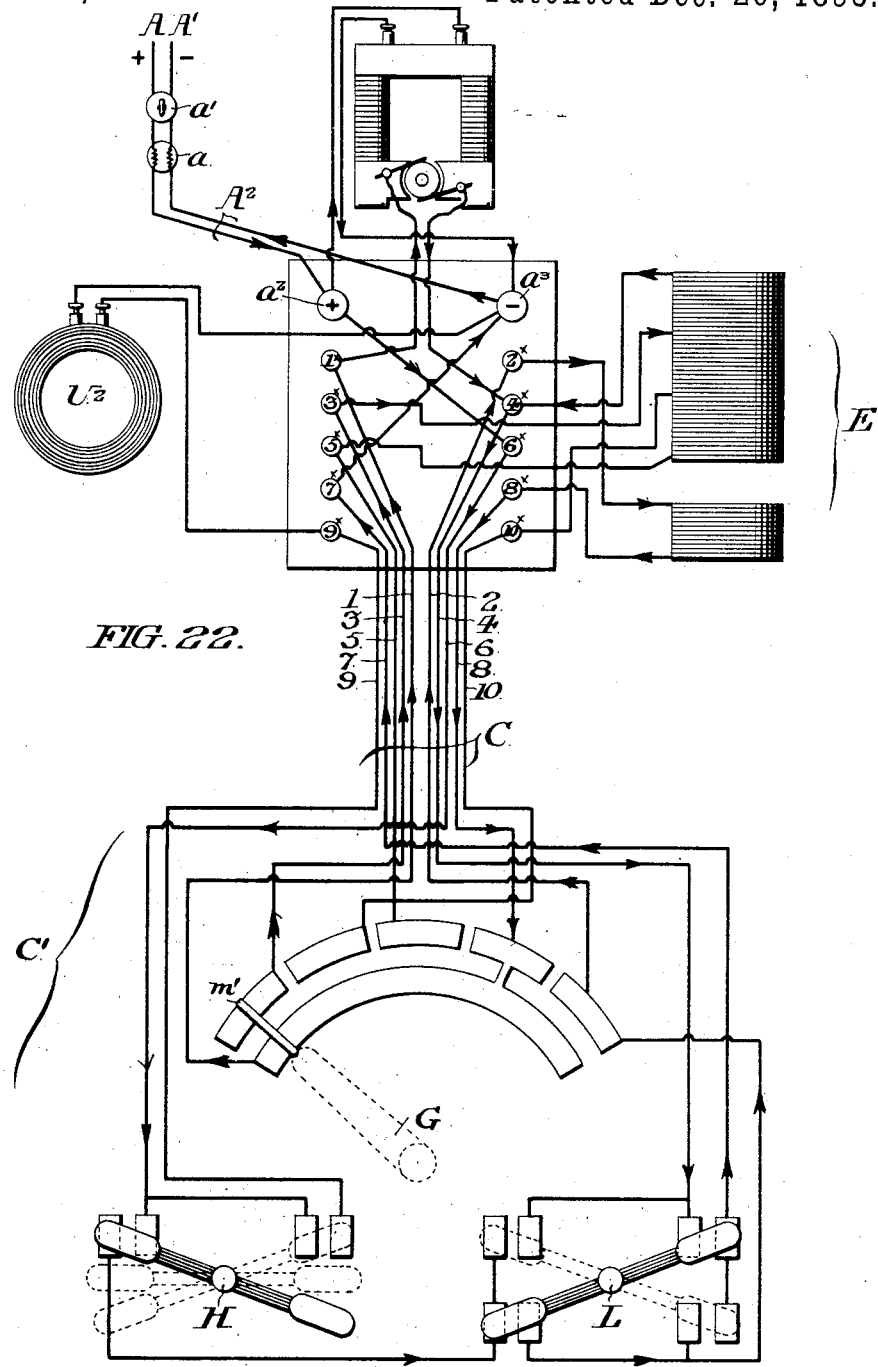

UNITED STATES PATENT OFFICE.

WILLIAM A. JOHNSTON, ARTHUR W. BROWNE, AND JOHN C. DAVIDSON, OF PRINCE'S BAY, NEW YORK, ASSIGNORS TO THE S. S. WHITE DENTAL MANUFACTURING COMPANY, OF PHILADELPHIA, PENNSYLVANIA.

ELECTRIC-MOTOR APPARATUS.

SPECIFICATION forming part of Letters Patent No. 511,621, dated December 26, 1893.

Application filed April 25, 1893. Serial No. 471,805. (No model.)

*To all whom it may concern:*

Be it known that we, WILLIAM A. JOHNSTON, ARTHUR W. BROWNE, and JOHN C. DAVIDSON, of Prince's Bay, in the county of Richmond and State of New York, have invented certain new and useful Improvements in Electric-Motor Apparatus, of which the following is a specification.

Our invention relates to certain improvements applicable to electric motors of the class employed for imparting motion to dental tools or other devices requiring but little power to actuate them, and embraces improvements in means for starting, stopping, reversing and controlling the speed of the motor; in the arrangement and manner of supporting various parts of the apparatus, and in sundry details, all as hereinafter specifically claimed.

Figure 6:
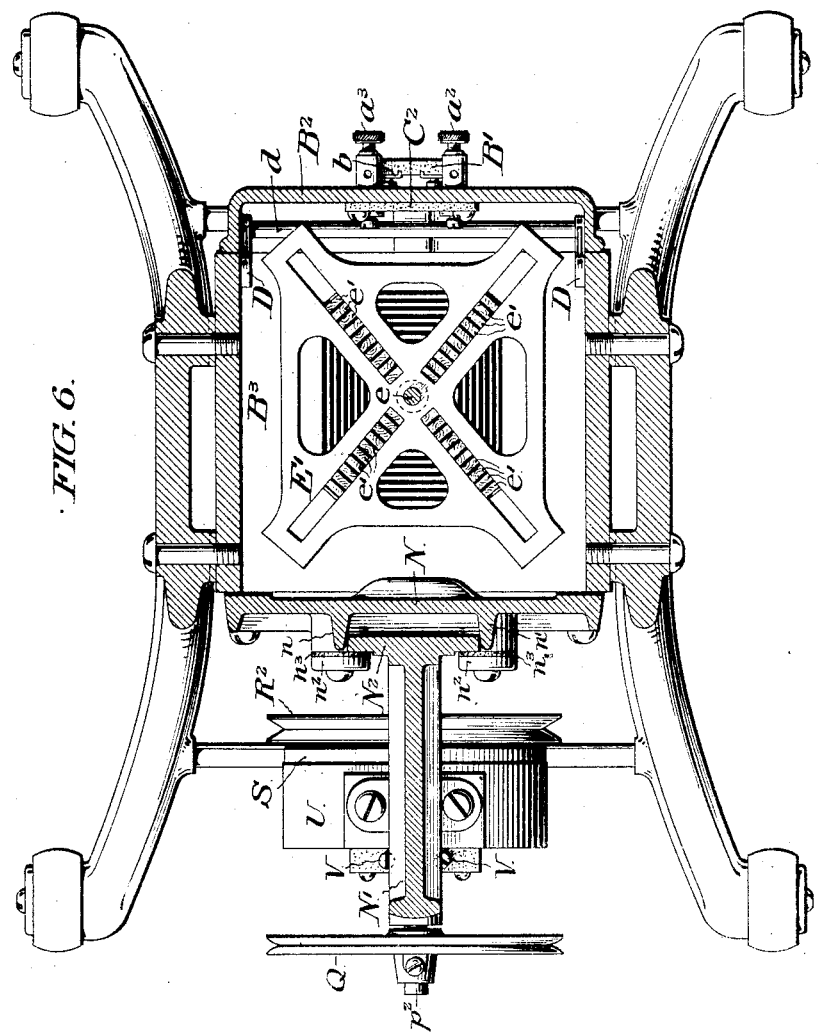
Figure 12:
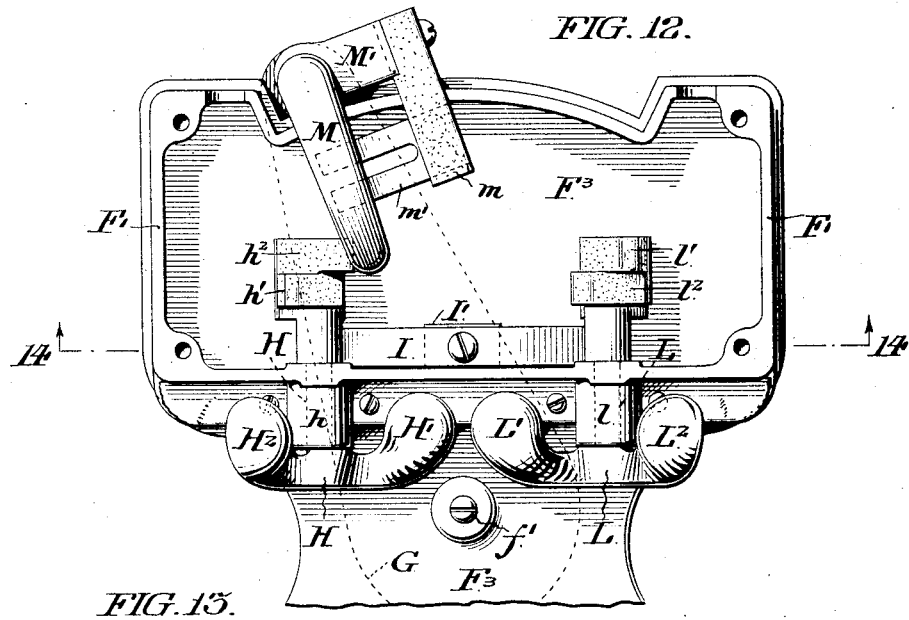
Figure 13:
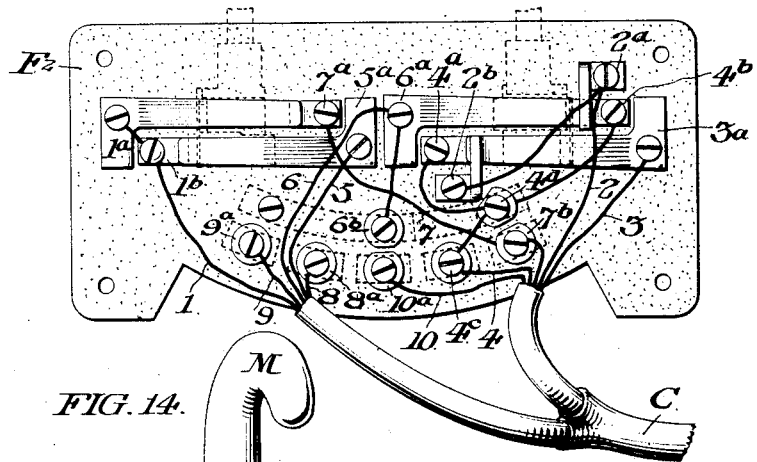
Figure 14:
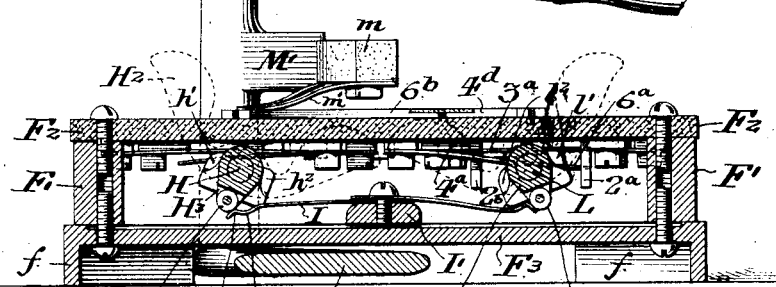
Figure 15:
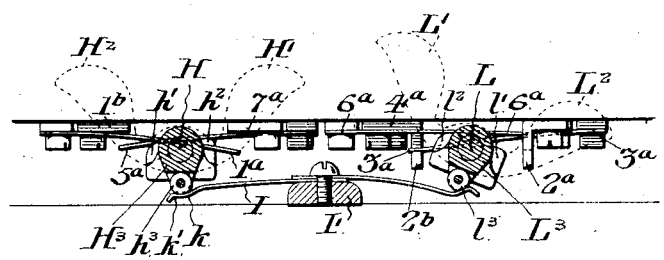
Figure 16:
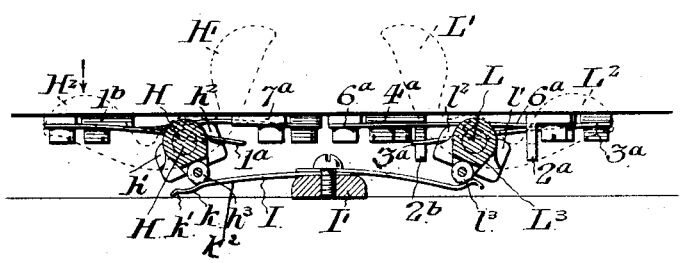
Figure 17:
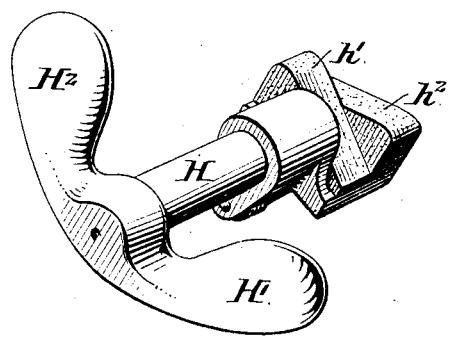

In the accompanying drawings Figure 1 is a view in perspective showing our improvements as employed for actuating a rotary dental instrument. Fig. 2 is a side elevation showing a portion of the motor stand with the adjustable bracket frame which supports a countershaft and its attachments and a bracket for mounting a dental engine-standard; and Fig. 3 a view in elevation of said adjustable frame and parts carried by it, with a modification. Fig. $3^a$ shows a plan of part of the belt guard. Fig. 4 is a view partly in elevation and partly in section on the lines 4 of Figs. 2 and 5, and Fig. 5 a section on the lines 5 of Figs. 3 and 4, representing details of construction of the electro-magnetic clutch mechanism and adjacent parts. Fig. $5^a$ is a section on the line $5^a$ of Fig. 4. Fig. 6 is a view showing parts in plan and parts in elevation on the line 6 of Fig. 1, showing details of construction. Fig. 7 is a front view of the rheostat box, detached. Fig. 8 represents a vertical central section through a portion of the rheostat box, the front being shown as opened, and the rheostat partly represented in elevation. Fig. 9 shows in elevation the inner side of the cable coupler for making electrical connection between the rheostat and the pedal switch; and Fig. 10 is a section on the line 10 of Fig. 9. Fig. $10^a$ shows a portion of a modified cable coupler. Fig. 11 is a plan view of the pedal switch devices; Fig. 12 a plan view of a portion of said devices, the top of the switch box being removed; Fig. 13 a view of the under side of the switch box-top with its connections, the switch-actuating rockshafts being partly represented by dotted lines; Fig. 14 a section on the line 14 of Figs. 11 and 12. Figs. 15 and 16 are diagram sections on the same lines as Fig. 14, with the arms or levers of the switch actuating rockshafts shown by dotted lines, and different adjustments of the switch being represented; and Fig. 17 is a view in perspective of one of the switch actuating rockshafts and its attachments. Fig. 18 is a diagram designed to illustrate the various electrical connections and the operation of the apparatus. Fig. 19 is a diagram designed to show the switch set for the highest speed with all conductors not in use in this adjustment broken away to more clearly illustrate the operation; Fig. 20 a similar diagram with the switch set for the next lower speed; Fig. 21 a similar diagram with the switch set for quickly stopping the motion of the countershaft. Fig. 22 is a diagram showing modifications to adapt the invention to the employment of a shunt wound motor.

Conductors A A' for the current of electricity, a safety fuse or automatic cut off $a$, and a switch $a'$ to open and close the circuit are provided as usual. By means of the two-strand insulated conductor $A^2$ the current is transmitted by way of one of the binding posts $a^2$ $a^3$ (in this instance by way of binding posts $a^2$) at the front of the rheostat box through the field coils B B of the motor to a terminal shown as constituted by the binding post $1^x$ of the conductor 1 of the cable C which makes electrical connection with a pedal switch C'. This insulated cable is in this instance shown as composed of ten conductors 1, 2, 3, 4, 5, 6, 7, 8, 9, 10, connected with their respective terminals or binding posts of the series $1^x$, $2^x$, $3^x$, $4^x$, $5^x$, $6^x$, $7^x$, $8^x$, $9^x$, and $10^x$ by the series of terminals shown as constituted by plates $b$, one for each binding post. These terminals $b$ are mounted upon the inner surface of a single supporting plate preferably of insulating material, such as vulcanized fiber, which we term the cable-coupler B'. This cable-coupler which may be of metal with the terminal plates properly insulated therefrom, is detachably connected with the front $B^2$ of the rheostat box $B^3$ in the following manner: The terminal plates are slotted at their ends to constitute catches, as plainly shown by Figs. 7 and 9 to engage with the heads of the binding posts $1^x$, $2^x$, $3^x$, $4^x$, $5^x$, $6^x$, $7^x$, $8^x$, $9^x$, $10^x$, secured to a non-conducting plate $C^2$ fastened by screws $c$ at its opposite ends to the inner side of the front of the rheostat box. The binding posts $a^2$ $a^3$ are secured to this plate $C^2$. A fixed pin $b^2$, or equivalent projection, on the front of the rheostat box beneath the cable-coupler serves to guard against the improper connection of the cable-coupler with the front of the rheostat box. Obviously the coupler could not be slid into position to engage with its securing screws from beneath, as this guard pin would offset the coupler and prevent its engagement with its retaining screws. Obviously the slotted terminal plates $b$ and the binding posts with which they respectively engage may be so arranged that the attachment in the proper way only can be made, thus dispensing with the use of the pin or fixed projection $b^2$. For instance, the binding posts $1^x$ to $10^x$ may be zigzagged, and the terminal plates slotted longitudinally, instead of transversely as will be understood by reference to Fig. $10^a$. The registering of the parts can only result under proper adjustment. The rheostat box is made to open at front, the front of the box being in this instance hinged at its bottom to the box by way of a cross rod $d$ and two radius links D one near each end of the rod. The outward swing of the box front is limited by a stop at its lower end as will be understood by reference to Fig. 8. Screws $d'$ $d^2$ serve to secure the hinged front in its closed position. By hinging the front of the rheostat box, it will be seen that access to the rheostat and conductors connected therewith is readily had; and that the renewal of a conductor is easily accomplished without disturbing the connections of the others. No particular form of hinge is necessary, but the one above described is deemed best as it gives a wide range of movement and serves to keep the opening front near enough to the box to prevent breaking or disturbing the connections.

The rheostat E may be of any ordinary suitable construction with terminals to provide for variable resistance by actuations of the pedal switch. We prefer, however, to construct it as follows:—Two spiders $E'$ $E'$ are secured to the opposite ends of a bolt $e$ and are separated by a sleeve (see dotted lines Fig. 6) surrounding the bolt and constituting a distance piece as will readily be understood. The radial arms of the spider are slotted and the coils of the rheostat are separated by insulated strips or layers $e'$ (which may be of wood) entering the spider slots at their opposite ends. The rheostat is held in position by pointed screws at the opposite ends of its central bolt which screws enter countersinks or notches in the bolt ends. One of said screws is shown at $e^3$, Fig. 1.

The conducting wires of the cable are connected with contacts of a foot-actuated or pedal switch $C'$ in the following way:—Conductor 1 connects with the starting contact spring $1^a$ and with clutch contact piece $1^b$; conductor 2 connects with the reversing contact bridges $2^a$ and $2^b$; conductor 3 connects with the reversing contact spring $3^a$; conductor 4 connects with the two reversing contact pieces $4^a$ $4^b$ and with the two contact pieces $4^c$ $4^d$; conductor 5 with the clutch contact spring $5^a$; conductor 6 with the contact spring $6^a$ and contact $6^b$; conductor 7 with the contact piece $7^a$ and with contact $7^b$; conductor 8 with the regulating contact piece $8^a$; conductor 9 with the regulating contact $9^a$, and conductor 10 with the regulating contact piece $10^a$. The above recited contacts are located partly within and partly on top of a box $F'$ through the front of which the cable of conductors passes, and this box is provided with a removable non-conducting top $F^3$ which is secured in place by screws. The bottom of the box is composed of a metal plate or casting $F^2$ having a flanged edge $f$ so as to provide room for a horizontally swinging lever G fulcrumed at one end to this bottom plate by a pivot $f'$. See Figs. 11, 12 and 14. At the rear end of the bottom plate there is provided a rest for the heel of the operator's foot. This heel-rest is shown as formed by a flexible attachment $G'$ fixedly secured at its forward edge to the metallic portion of the bottom plate. The heel-rest is preferably made of sheet rubber to lower the heel-rest and also to lessen liability of the operator's heel slipping when he is actuating the switch. There is also more friction created between such flexible attachment and the floor than where metal is used in lieu thereof and faced on top with rubber, leather, &c., for the operator's heel, with or without a bottom facing of rubber, &c., to increase friction with the floor, and consequently the accidental sliding or slipping of the heel rest and attached casing or box $F'$ carrying the electric switch mechanism is effectally guarded against during actuations of the switch by the foot.

Starting, stopping, reversing and speed controlling switch devices are employed as follows:—A switch actuating rockshaft H is mounted in a bearing $h$ at the rear side of the switch box $F'$, and has two arms or levers $H'$ $H^2$ projecting sidewise and upwardly from it. The length and upward curvature or inclination of these arms are such that normally their outer ends to receive the pressure of the operator's foot terminate in the same horizontal plane above the level of the top of the switch box. At it sinner end the rockshaft has two oppositely inclined cams $h'$ $h^2$ of non-conducting material, such as vulcanized fiber. The rockshaft is also provided with a cam arm $H^3$ provided with an anti-friction roller $h^3$ which roller might, however, be dispensed with.

A spring I is secured upon a lug I' of the switch box (see Figs. 12, 14, 15 and 16) and bears upward at its free end against the cam roller $k^3$, or directly against the cam end if no roller is used. The free end of this spring is shaped in peculiar manner for purposes to be explained. From the above description it will be seen that when the switch actuating rockshaft H is in its normal position the cam roller $h^3$ rests in the depression $k$ of the spring I, (see Fig. 15,) and that the upward pressure of the spring yieldingly locks the rockshaft against movement. With the lever in this position the apparatus is out of operation, the spring contact $1^a$ being free from the contact piece $7^a$. With the rockshaft brought to the position indicated by Figs. 11 and 14 by depressing the arm H' by the foot, the circuit is closed and the apparatus is started into operation. In this position of the lever it will be seen that the spring contact $1^a$ is elevated and caused to touch contact piece $7^a$ by the action of the cam $h'$. The rockshaft is yieldingly held in this position by the pressure of the inclined end $k'$ of the spring I against the cam roller $h^3$. To quickly throw the apparatus out of operation, by the action of an electro-magnetic clutch to be farther on described, the foot pressure is brought to bear upon the lever arm H² thus moving the rockshaft into the position indicated by Fig. 16, with the cam roller $h^3$ borne upon by the incline $k^2$ of the spring I. In this position of the rockshaft the cam $h^2$ acts upon the contact spring $5^a$ and makes connection with contact $1^b$. As soon as the rockshaft is relieved from the pressure of the foot it is caused to assume its normal position (Fig. 15) by the action of the spring I. A second switch-actuating rockshaft L having bearing in the switch box at $l$, is substantially similar to rockshaft H, being provided with the arms L' L², the oppositely inclined non-conducting cams $l'$ $l^2$, and the cam arm L³ and roller. In the position in which the rockshaft is shown in Figs. 11, 12 and 14 the cam $l'$ actuates contact spring $3^a$ to make connection with contact piece $4^a$. At the same time the contact spring $6^a$ is relieved from pressure of the cam $l^2$ and makes connection with contact bridge $2^a$ which is connected by wire with contact bridge $2^b$. To reverse the direction of rotation of the motor the rockshaft arm L² is depressed and the cam $l^2$ acts upon contact spring $6^a$ raising it to make connection with contact piece $4^b$. At the same time contact spring $3^a$ is freed by the cam $l'$ and makes connection with contact bridge $2^b$ after breaking connection with contact piece $4^a$.

For varying the speed of the motor regardless of the direction of its rotation the lever G is provided with an upwardly projecting part or arm M at the front of the pedal switch, having a side projection M' constituting a securing seat for a non-conducting carrier $m$ of a spring contact bridge $m'$.

Upon the non-conducting top of the switch box are secured the hereinbefore referred to contact pieces $9^a$, $6^b$, $8^a$, $10^a$, $4^c$, $7^b$, and $4^d$. These contact pieces are arranged in two rows in the form of segments of circles concentric with the pivot $f'$ of the lever G, and by their binding screws are connected with the cable conductors as already explained. The contact bridge $m'$ serves to make connection between opposite segments of the two rows, this bridge swinging with the lever G. The upwardly projecting part of the lever is pushed by a sidewise movement of the foot of the operator into any desired position, and the curved or bent termination of this part enables the operator by his foot to lift and change the position of the pedal switch on the floor.

The motor stand is mounted upon rollers so that it can be readily moved into any desired position, and the rheostat box is secured to the stand frame in any suitable way. Upon the back plate N of the rheostat box is supported a bracket frame N' of the stand, upon which is mounted a countershaft actuated from the motor, an electro-magnetic clutch, and a dental engine standard. The bracket frame N' is shown as vertically adjustable in order to act as a belt tightener as will farther on be understood, and has an attaching plate N² fitted to slide in a guideway formed between vertical ribs $n$ $n'$ on the back plate N of the rheostat box. Four screws having metallic washers $n^2$ overlapping the edges of the attaching plate engage with the back plate at its ribbed portion $n$ $n'$ (two for each rib, one near the top and the other near the bottom thereof) and leather or equivalent washers $n^3$ are interposed between the metallic washers and the attaching plate to insure a snug fitting of the parts and prevent rattling.

The bracket frame is provided at top with a ribbed seat $o$ for a bracket O' having a socket $o'$ for the standard O² of a dental engine of any well known construction. A screw $o^2$ and a groove $o^3$ in the base of the socketed bracket engaging the ribbed seat $o$ serve to securely connect the parts. To vertically adjust the frame there is provided an adjusting screw P engaging with a female screw in the attaching plate N², and provided with fixed collars $p$ $p$, between which it is fitted to turn in a bearing P' on the back plate N, endwise movement of the screw in its bearing being prevented, as will be readily understood. A downwardly projecting arm P² of the frame is provided at its lower extremity with a bearing $p'$ for the outer end of a countershaft $p^2$, the inner end of which is supported by a bearing $p^3$ on the attaching plate of the frame. A pulley Q on this countershaft drives the belt Q' of the dental engine to impart rotation to the instrument to be actuated. Motion is imparted to the countershaft by a belt R passing from a pulley R' on the motor armature shaft to an actuating pulley R² loosely mounted on the countershaft.

The rotation of the counter-shaft may be quickly arrested by the operation of an electro-magnetic clutch constructed as follows:— An armature clutch disk S rotating with the countershaft is adapted to be engaged with and disengaged from the countershaft pulley R². This armature clutch disk is provided with a sleeve S' slotted at s and is acted upon by a spring s' which presses upon the disk with a tendency to hold it in its operative position—that is, engaged with the pulley R². A screw s² secured to a sleeve S² fast on the countershaft projects at its head into the slot s of the disk sleeve and while allowing of movement of this sleeve endwise causes it to rotate with the fast sleeve S². Frictional clutch engagement of the disk with the pulley R² is provided for by means of blocks T of any desired number secured by screws to the face of the armature clutch disk adjacent to the pulley. These blocks are made of vulcanized fiber, but may be composed of any other suitable material producing requisite friction against the pulley; or instead of blocks a single ring may be employed. The outer edge of each block (or of the ring if employed) is beveled to engage the beveled annular shoulder t upon the inner face of the pulley adjacent to its periphery. An annular electro magnet U secured to the frame bracket has inserted within its annular chamber U' a coil of insulated wire U² which is held in position by a non-magnetic ring u secured in place by screws u' passing through its lugs u², as will be understood by reference to Figs. 4, 5 and 5ª. The coil U² is electrically connected with the binding screws V V, as will be understood by reference to Figs. 2, 3, 4 and 5. When a current is passed through the magnet coil the magnet is caused to attract the armature clutch disk and disengage it from the pulley R², the pressure of the spring being overcome. At the same time the frictional contact between the armature clutch disk and the non-magnetic ring u quickly arrests the rotation of the countershaft.

When instead of a dental engine such as shown, a suspension engine supported from a wall bracket or the ceiling is used, the socketed bracket O' is detached from its seat and an adjustable belt guard (see Figs. 3 and 3ª) is attached to the seat o in its place. This belt guard is constructed as follows:—An attaching block W carries a longitudinally slotted supporting bar W' through the slot of which passes a clamp screw w provided with a washer w' for adjustably securing the supporting bar to the attaching block. At its outer end the supporting bar is provided with a pivoted head Y, which may be rocked about the supporting bar on the screw y which serves both as a clamp and pivot. Forks y' y' projecting in opposite directions from the pivoted head embrace the engine driving belt and guard against its being accidentally thrown from the pulley Q. It will be obvious that this belt guard may be adjusted to embrace the belt whether it pass from the pulley in a horizontal line or upward therefrom, at an angle or vertically, and that in the possible event of the belt being thrown from the pulley it will be held by the pivoted head (on opposite sides of which it passes) in convenient position to be readily replaced.

From the foregoing description aided by reference to the diagrams the operation of the apparatus will be understood.

In Fig. 18 which shows the apparatus as set for the slowest speed, the current passes through the various conductors in circuit in the direction indicated by the arrow heads. In this figure the conductors represented by dotted lines z z indicate a modification whereby the dead resistance of the rheostat is dispensed with and additional coils are wound about the field magnets to increase their strength.

In Fig. 19 which shows the apparatus as set for the highest speed all dead conductors are broken away and the direction in which the current passes can be traced by the arrow heads.

In Fig. 20 which shows the apparatus as set for next to the highest speed the dead wires are broken away and the direction of the current indicated by arrow heads.

Fig. 21, in which all dead wires are broken away, and the direction of the current indicated by arrow heads, shows the operation when the apparatus is set to actuate the electro-magnetic clutch.

The direction in which the current passes when the apparatus is set for next to the lowest speed and for medium speed can be understood by reference to Fig. 18, the only difference being that additional portions of the rheostat are cut in.

Z indicates the point at which the rheostat is cut in for next to the lowest speed, and z' the point at which the rheostat is cut in for medium speed. It is obvious that when the direction of rotation of the motor is reversed by the actuation of the rockshaft L the current passes to the armature in directions the reverse of those indicated by the arrow heads.

Where a motor of the shunt wound type is substituted for a motor of the series wound type, as indicated by Fig. 22 the operation of the apparatus would be substantially as before described.

We claim as our invention—

1. The combination of the series of conductors, the slotted terminal plates with which they are respectively connected, the supporting plate to which said terminal plates are connected, and the binding posts engaged by the slotted terminal plates, substantially as set forth.

2. The combination of the series of conductors, the slotted terminal plates with which they are respectively connected, the supporting plate to which said terminal plates are connected, the binding posts engaged by the slotted terminal plates, and the fixed projection which insures the proper adjustment of the supporting plate, substantially as set forth.

3. The combination of the rheostat, its box, the box front carrying binding posts connected with conductors, and the radius links by which the box front is hinged in place and limited in its opening movement, substantially as set forth.

4. The combination of the spiders having the slotted arms, the rheostat coils, the central bolt, and the separating strips entering the spider arm slots, substantially as set forth.

5. The combination of foot-actuated electric motor switch mechanism, its box, and the flexible heel rest for the foot, having rigid connection with the box, substantially as set forth.

6. The box for the foot-actuated electric motor switch mechanism, provided with the bottom plate and the fixedly connected heel rest for the foot, substantially as set forth.

7. The combination of the foot-actuated electric motor switch mechanism, its box, the foot actuated lever provided with the upward projection extending above the box at its front and adapted to be operated by the sidewise pressure of the foot, and the heel rest in rear of the box and having rigid connection therewith, substantially as set forth.

8. The combination in electric motor switch mechanism, of an actuating rockshaft provided with the cam arm, the spring acting on the cam arm, and the levers operated by the foot to turn the rockshaft in opposite directions, substantially as set forth.

9. The combination, in electric motor switch mechanism, of an actuating rockshaft, two oppositely inclined cams at its inner end, the cam arm, and the spring acting on the cam arm, substantially as set forth.

10. The combination, in electric motor switch mechanism, of an actuating rockshaft, its two levers, the two opposite inclined cams, the cam arm, and the spring acting on the cam arm, substantially as set forth.

11. The combination in electric motor switch mechanism, of an actuating rockshaft, its two oppositely inclined cams, the cam arm, the spring acting on the cam arm, and contacts actuated by the oppositely inclined cams, substantially as and for the purpose set forth.

12. The combination of the foot-actuated switch mechanism, its box having the flanged bottom plate, and the speed-varying lever fulcrumed at the under side of the bottom plate, substantially as set forth.

13. The combination in electric motor switch mechanism, of the switch box, and the speed-varying lever fulcrumed at its rear end beneath the switch box and having a part projecting above the switch box, whereby it may be actuated by sidewise pressure of the foot, substantially as set forth.

14. The combination, in electric motor switch mechanism, of the switch box, the lever fulcrumed at one end beneath the switch box and having a part projecting above the switch box, the spring contact bridge supported by the lever above the switch box, and the two segmental rows of contact pieces, whereby speed of the motor may be varied, substantially as set forth.

15. The combination of the stand, the electric motor carried thereby, the rheostat, its box secured to the stand, the bracket frame of the stand, the countershaft carried by the bracket frame, and the pulley thereon actuated from the motor, substantially as set forth.

16. The combination of the stand, the electric motor carried thereby, the bracket frame having supporting connection with the stand, the countershaft carried by the bracket frame, its actuating pulley, the pulley on the motor armature shaft, the belt passing about this pulley and the actuating pulley of the countershaft, and means for vertically adjusting the bracket frame to tighten said belt, substantially as set forth.

17. The combination of the stand, the electric motor carried thereby, the bracket frame of the stand provided with the seat to secure the socketed bracket or belt guard, the countershaft carried by the bracket frame, its actuating pulley, the pulley on the motor armature shaft, and the belt passing about this pulley and the actuating pulley of the countershaft, substantially as set forth.

18. The belt guard provided with the longitudinally slotted supporting bar, the head pivoted to the outer end of the supporting bar and provided with forks projecting in opposite directions therefrom, and the screw which serves as a pivot for the head and to clamp it in position, substantially as set forth.

19. The belt guard for attachment to the stand of an electric motor, consisting of the attaching block, the longitudinally slotted supporting bar, the clamp screw adjustably securing the supporting bar to the attachment block, the head pivoted to the outer end of the supporting bar and provided with forks projecting in opposite directions therefrom, and the screw which serves as a pivot for the head and to clamp it in position, substantially as set forth.

20. The combination of the countershaft, the loosely mounted pulley by which it is actuated, the armature clutch disk rotating with the countershaft and capable of sliding movement relatively thereto, the spring by the action of which the clutch is normally held engaged with the loosely mounted pulley to cause rotation of the countershaft with the pulley, and the electro magnet between which and the pulley the clutch disk is mounted and which when excited causes disengagement of said disk and pulley, substantially as set forth.

21. The combination of the countershaft, the loosely mounted pulley by which it is actuated, the armature clutch disk rotating with the countershaft and capable of sliding movement relatively thereto, the spring by the action of which the clutch disk is normally held engaged with the loosely mounted pulley to cause rotation of the countershaft with the pulley, the annular electro-magnet containing the coil in its chamber, between which magnet and the pulley the clutch disk is mounted and which when excited causes disengagement of said disk and pulley, and the non-magnetic ring, substantially as set forth.

In testimony whereof we have hereunto subscribed our names.

WILLIAM A. JOHNSTON.
ARTHUR W. BROWNE.
JOHN C. DAVIDSON.

Witnesses:
SEYMOUR CASE,
B. F. STANTON.